United States Patent [19]

Rauckhorst, III

[11] Patent Number: 5,562,265
[45] Date of Patent: Oct. 8, 1996

[54] VIBRATING PNEUMATIC DEICING SYSTEM

[75] Inventor: Richard L. Rauckhorst, III, North Canton, Ohio

[73] Assignee: The B. F. Goodrich Company, Akron, Ohio

[21] Appl. No.: 322,905

[22] Filed: Oct. 13, 1994

[51] Int. Cl.$^6$ .................................................. B64D 15/00
[52] U.S. Cl. .................................. 244/134 R; 244/134 A
[58] Field of Search ........................... 244/134 R, 134 A

[56] References Cited

U.S. PATENT DOCUMENTS

| | | |
|---|---|---|
| 4,561,613 | 12/1985 | Weisend . |
| 4,747,575 | 5/1988 | Putt et al. . |
| 4,865,291 | 9/1989 | Briscoe et al. ........................ 244/134 A |
| 5,098,037 | 3/1992 | Leffel et al. ........................ 244/134 R |
| 5,271,598 | 12/1993 | Hohenshil et al. . |
| 5,275,362 | 1/1994 | Weisend, Jr. et al. ............... 244/134 R |
| 5,393,014 | 2/1995 | Weisend, Jr. et al. ............... 244/134 R |

FOREIGN PATENT DOCUMENTS 2128155  4/1984  United Kingdom ............... 244/134 R

*Primary Examiner*—Andres Kashnikow
*Assistant Examiner*—Tien Dinh
*Attorney, Agent, or Firm*—Richard A. Romanchik

[57] ABSTRACT

A pneumatic deicing system includes a deicer assembly comprised of an outer layer having a low modulus of elasticity, an inner ply, and a plurality of inflatable members provided therebetween. The deicer assembly is disposed directly on top of and bonded to an airfoil. The inflatable members are inflated with an inflation apparatus that inflates in an inflation pattern comprised of a sequence of high frequency pressure pulses superimposed on a low frequency inflation pressure wave.

24 Claims, 6 Drawing Sheets

VIBRATING PNEUMATIC DEICING SYSTEM

FIELD OF THE INVENTION

The present invention relates to deicing systems and more particularly, a pneumatic deicing system which vibrates at higher frequencies while inflating at lower frequencies.

BACKGROUND OF THE INVENTION

Under certain operating conditions aircraft are vulnerable to accumulation of ice on component surfaces. It is well known that such accumulation of ice can lead to disastrous results. A wide variety of systems have been developed for removing ice from aircraft during flight and can be placed into three general categories: thermal, chemical, and mechanical.

The mechanical category of deicing systems operate by distorting the airfoil surface of the aircraft to be deiced. Distortion of the airfoil surface causes cracking in the ice accumulated thereon, and subsequent dispersal of that ice into the air stream passing over the aircraft component.

The principal commercial mechanical deicing means is commonly referred to as pneumatic deicing wherein a component (e.g. the leading edge of a wing) of an aircraft is covered with a plurality of expandable, generally tube-like structures inflatable by employing a pressurized fluid, typically air. Upon inflation, the tubular structures tend to expand substantially the leading edge profile of the wing or strut and crack ice accumulating thereon for dispersal into the air stream passing over the aircraft component. Typically, such tube-like structures have been configured to extend substantially parallel to the leading edge of the aircraft component.

Efforts to improve such systems have led to continuing developments to improve their versatility, practicality and efficiency.

DISCLOSURE OF THE INVENTION

According to the present invention, a pneumatic deicing system includes:
   an inflatable deicer comprised of a top layer having a modulus of elasticity less than 40,000 kPa and at least one inflatable member for distorting said top layer; and,
   an inflation apparatus for inflating said inflatable member in an inflation pattern comprised of a sequence of high frequency pressure pulses superimposed on a low frequency inflation pressure wave.

According to another aspect of the present invention, a method of deicing an airfoil included the steps of:
   disposing an inflatable deicer to the airfoil, said inflatable deicer having a top layer having a modulus of elasticity less than 40,000 kPa and at least one inflatable member for distorting said top layer; and,
   inflating said inflatable member in an inflation pattern comprised of a sequence of high frequency pressure pulses superimposed on a low frequency inflation pressure wave.

The present invention provides improved ice shedding capabilities over prior pneumatic deicing systems while utilizing much of the same technology. In addition, the present invention is inexpensive and retrofitable to existing systems.

These and other objects, features, and advantages of the present invention will become more apparent in light of the detailed description of exemplary embodiments thereof, as illustrated by the drawings.

BEST MODE FOR CARRYING OUT THE INVENTION

The present invention provides an apparatus for deicing a leading edge surface. By "deicing" what is meant is the removal of ice subsequent to formation of the ice upon the leading edge. By "leading edge" what is meant is that portion of a surface of a structure which functions to meet and in substantial measure break an air stream impinging thereon. Examples of leading edges would be forward edge portions of wings, stabilizers, struts, nacelles, propellers, rotating wings, tail rotors, and other housings, objects and protrusions first impacted by an air stream flowing over an aircraft in flight as well as spars, struts and other structural elements of marine vessels, towers and buildings.

Figure 1:
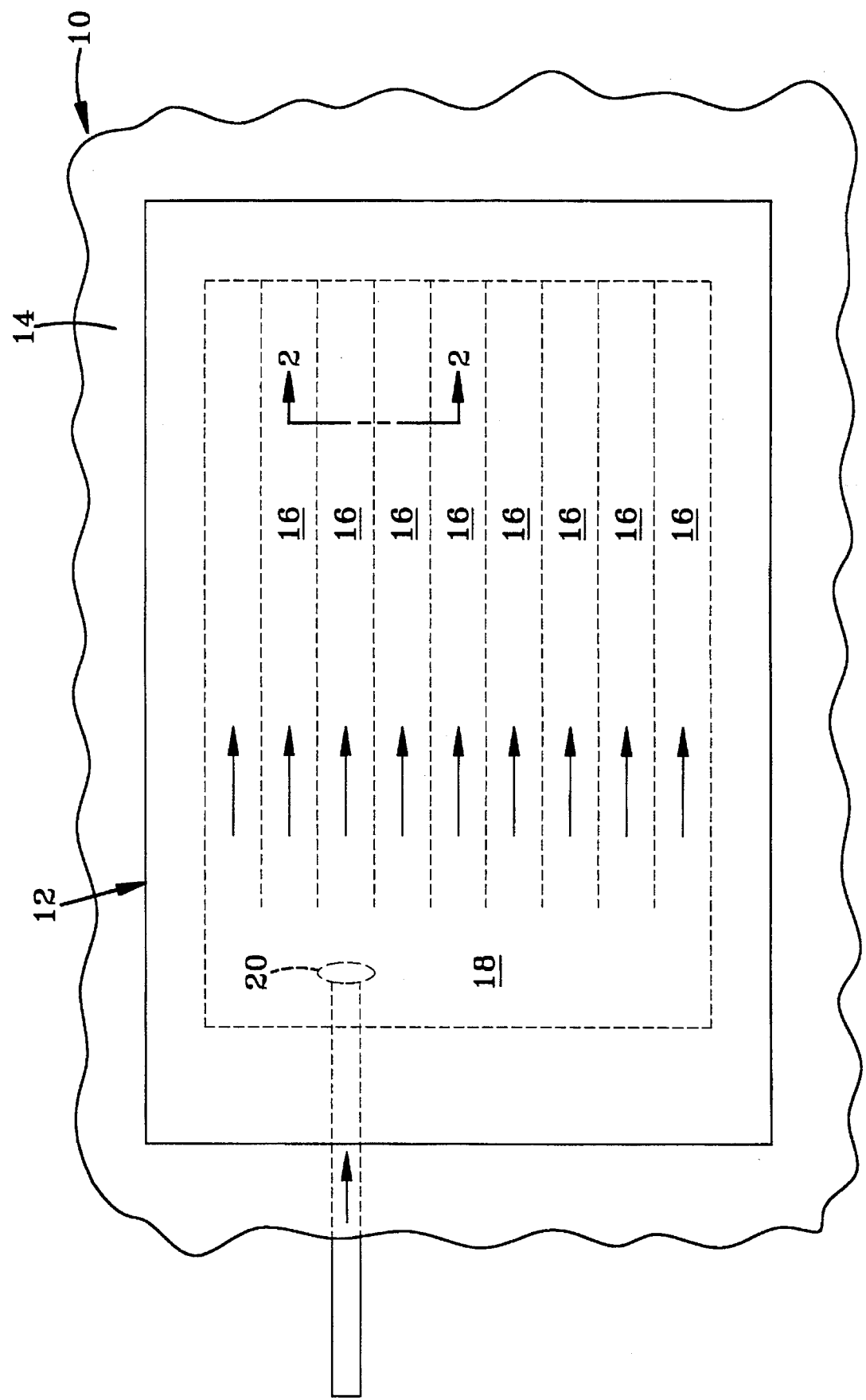
FIG. 1 is a top view of a pneumatic deicing system in accordance with the present invention.

FIG. 1 illustrates a pneumatic deicer 12 in accordance with the present invention formed from a composite having rubbery or substantially elastic properties. The deicer 12 is disposed on an airfoil 14. A plurality of inflatable members or tubes 16 are formed in the composite and are provided pressurized fluid, such as air, from a manifold 18. The manifold 18 is supplied fluid via a connector 20, which transfers fluid from a pressurized source (not shown). Connector 20 is integrated into the deicer 12 during manufacturing. Tubes 16 expand or stretch under pressure by 40% or more during inflation cycles, thereby causing a substantial change or distortion in the profile of the deicer (as well as the leading edge) to cause cracking of ice accumulating thereon. The times for inflating such tubes average between 2 and 6 seconds.

Figure 2:
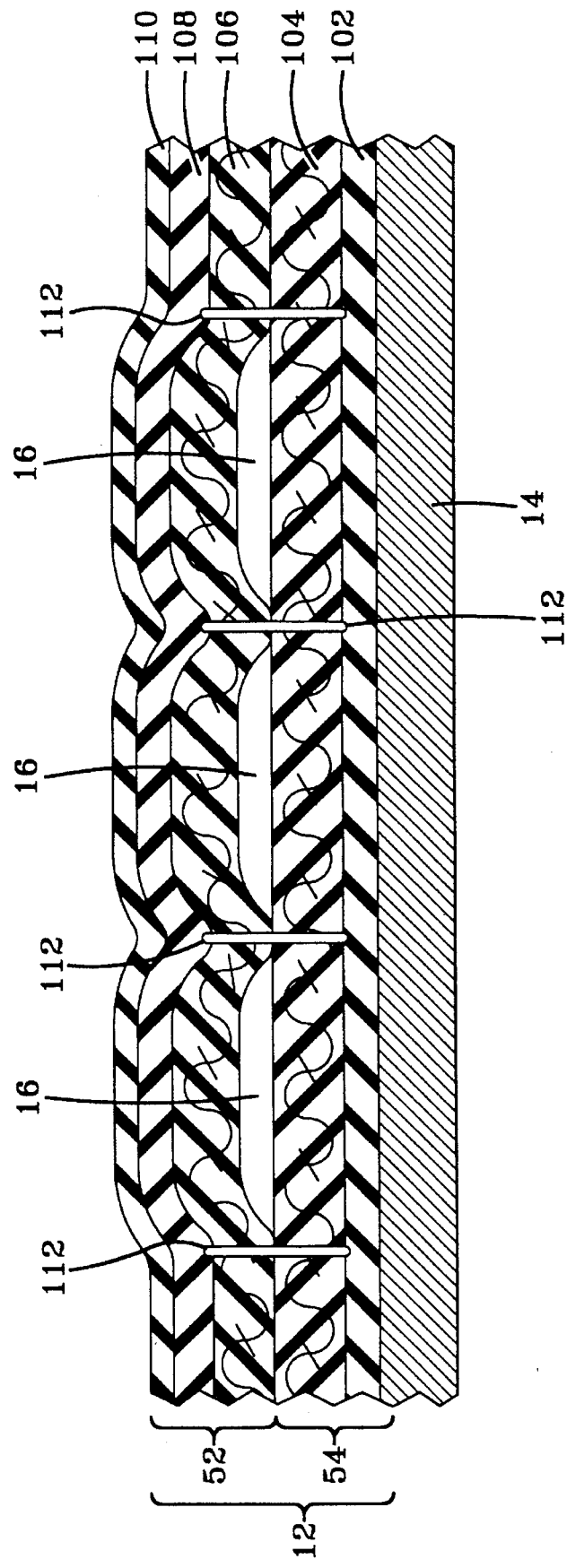
FIG. 2 is a cross sectional view, taken along line 2—2 of FIG. 1, of a pneumatic deicing system in accordance with the present invention.

Referring now to FIG. 2, the preferred construction for deicer assembly 12 of FIG. 1 is a composite, comprised from bottom (the side of material attached to the airfoil 14) to top of: a) a bottom rubber layer 102 on the order of 0.01–0.03 inch thick; b) a layer 104 on the order of 0.012 inch thick nonstretchable nylon fabric having rubber coating on one side; c) a layer 106 on the order of 0.020 inch thick stretchable nylon fabric having rubber coating on one side; d) a gum layer 108 on the order of 0.20 to 0.30 inch thick natural rubber; and e) a top rubber layer 110 on the order of 0.010 inch thick. Rubber layers 100, 110 are preferably made from rubber or rubber-like material such as a plasticizing compound that may include fabric reinforcement, or other compound having a modulus of elasticity of less than 40,000 kPa. Suitable or conventional rubber or rubber-like materials are well known in the art, such as chloroprenes (such as NEOPRENE®, a registered trademark of E.I. DuPont denemours & Company), nitrile rubbers or polyurethanes. Tube-like members 16 are created by sewing the nylon layers 104, 106 together in the appropriate pattern. Thread lines 112 illustrate the forming of three tube-like members, which are illustrated in a partially inflated state. The preferred material for thread 112 is nylon or KEVLAR® (a registered trademark of E.I. DuPont denemours & Company). Also for exemplary purposes, all lines in FIGS. 1 which are created by sewing thread (as shown in FIG. 2) in this manner are illustrated as thick dotted lines. Layers 100 and 104 may be bonded to layer 102 utilizing an appropriate cement. Likewise layers 106 and 110 may be bonded to layer 108 using an appropriate cement. It is to be noted that the bottom three layers 100, 102 and 104 comprise a bottom ply 54 and the top three layers 106, 108, 110 comprise a top ply 52.

Figure 3:
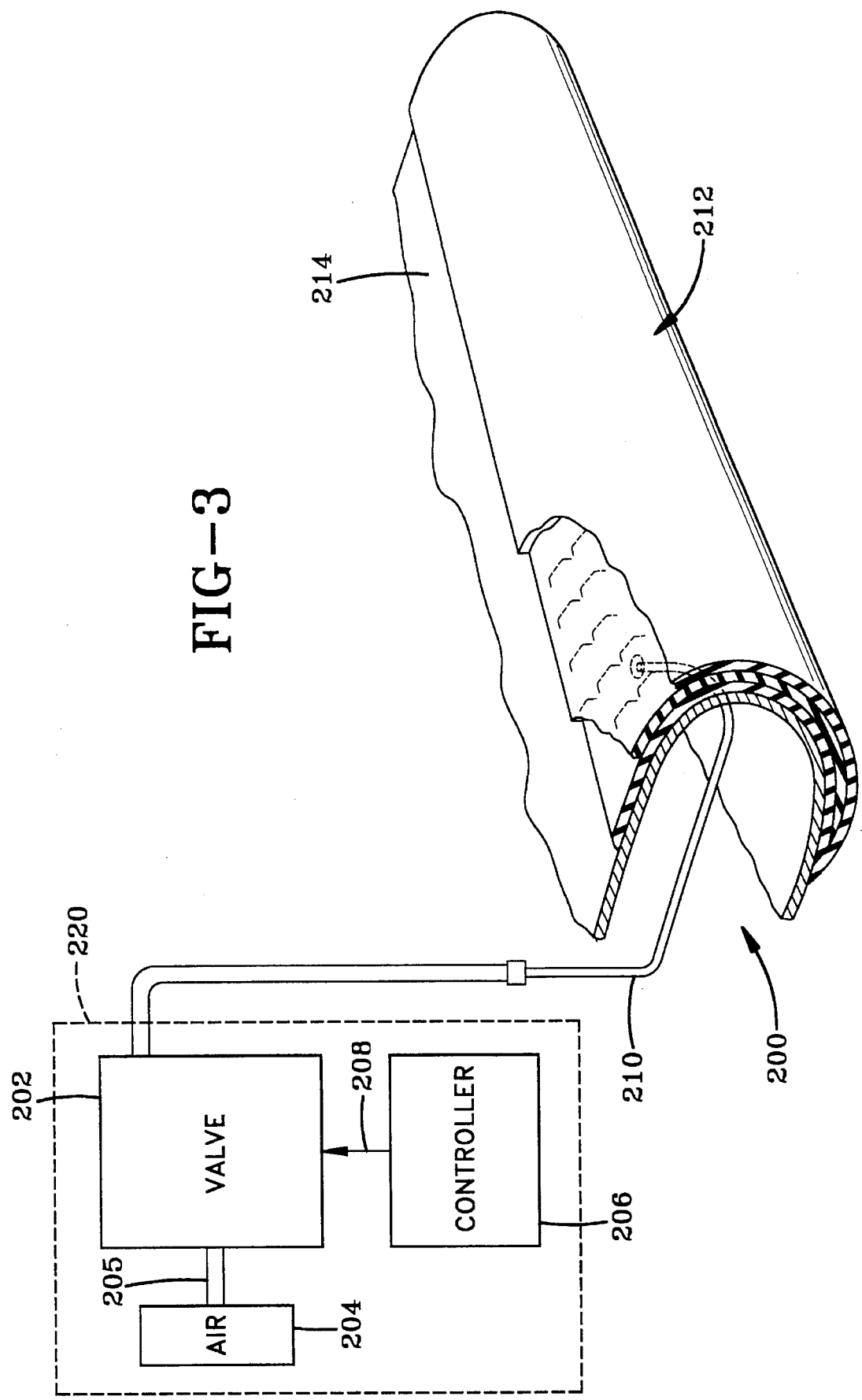
FIG. 3 is a developed top view, partly cut away, of a pneumatic deicing system in accordance with the present invention.
Figure 4:
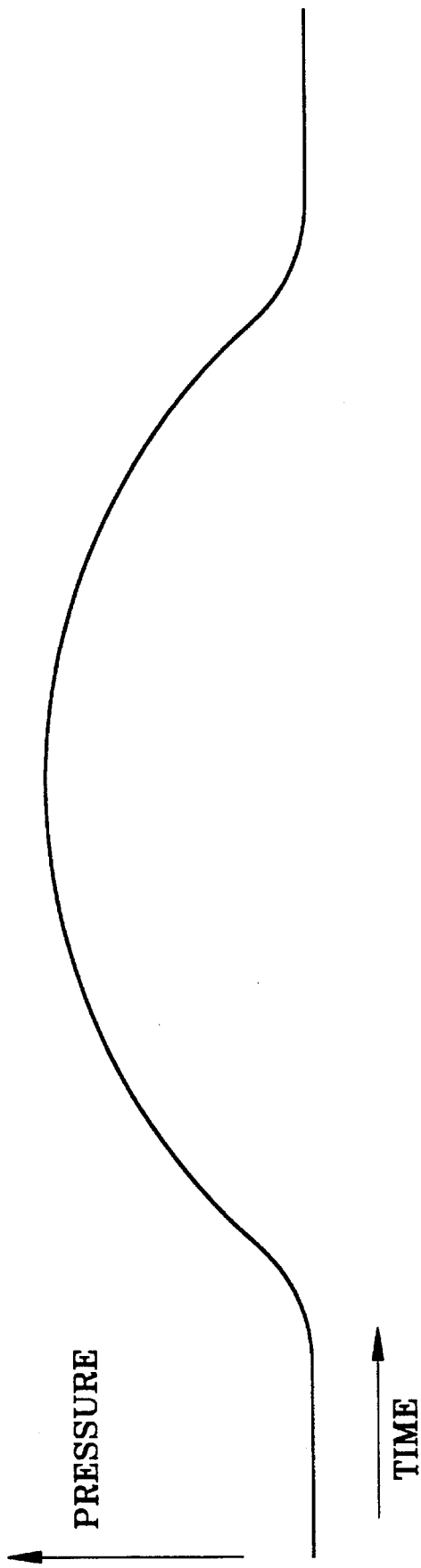
FIG. 4 is a graphical representation of a prior art inflation pattern for a pneumatic deicing system.

Referring now to FIG. 3, there is shown pneumatic deicing system 200 generally, comprising a pneumatic valve 202 joined by a conduit 210 to a pneumatic deicing apparatus 212 (deicer) which in the embodiment illustrated is attached to an airfoil 214 such as a wing of an aircraft. The deicer apparatus is preferably formed in accordance with the present invention as illustrated in FIGS. 1 and 2. Valve 202 controls the flow of air from a pressurized air source 204 to the deicer 212 and is controlled by a controller 204 via a line 208. A conduit 205 connects the air source 204 to valve 202. Valve 202 may be any of a number of valves known in the art, such as Model No. 3D2381-62 available from the B.F.Goodrich Company. Air source 204, valve 202 and controller 206 comprise a low pressure inflation system or apparatus 220 for inflating deicer 212 in a pulsating or vibrating manner. What is meant by low pressure is the on order of 7 to 700 kPa. Of course, the air source 204, valve 202 and controller 206 can be combined into a singular unit.

Controller 208 controls valve 202 to thereby control the rate of inflation of deicer 212 and cause deicer 212 to inflate in a pulsating or vibrating pattern, as will be described in greater detail hereinafter. Controller 212 may be any of a number of programmable control systems known in the art. For instance, controller 212 may be comprised of Model No. 4D2037-TDB available from the B.F.Goodrich Company.

Referring now to 4, wherein a graph of a prior art pneumatic deicer inflation pattern is illustrated. The graph is representative of the pressure in the air supply conduit feeding the deicer. It can be seen that the deicer is inflated and deflated in a smooth, rounded or bell shaped pattern.

Figure 5:
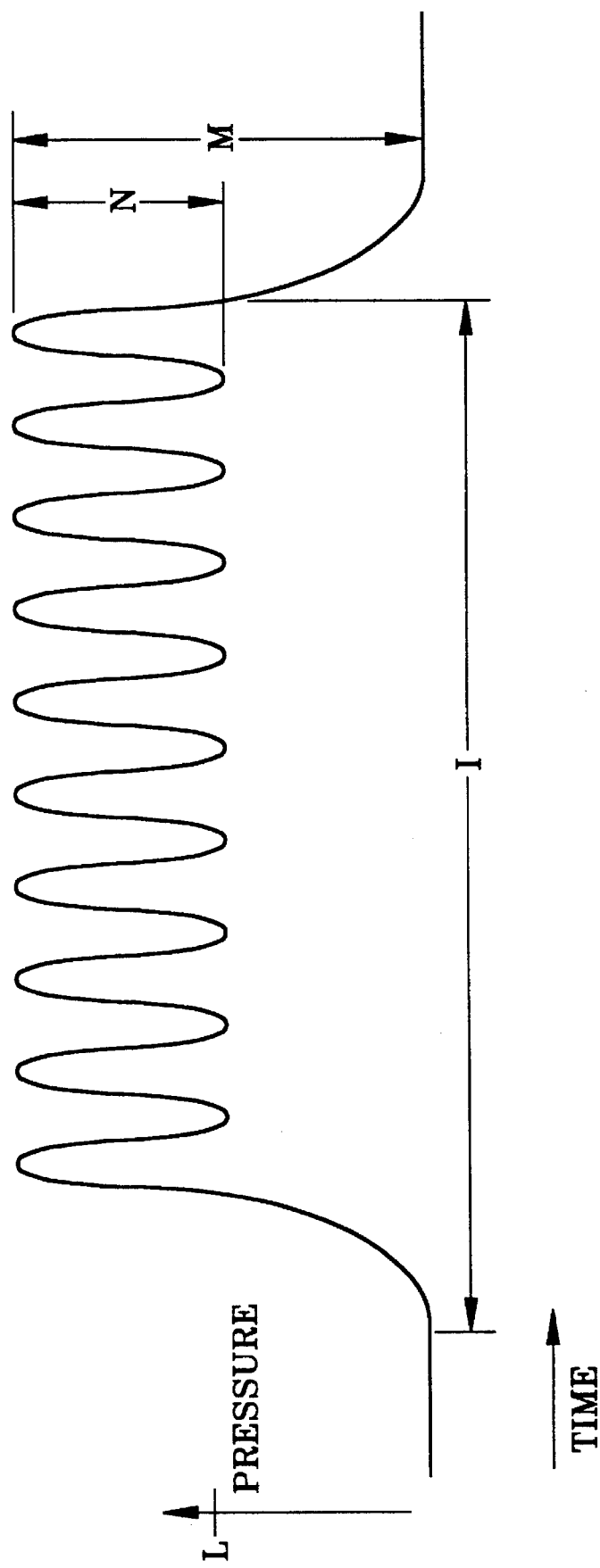
FIG. 5 is a graphical representation of an inflation pattern for a pneumatic deicing system in accordance with the present invention.

Referring now to FIG. 5, wherein a graph of a pneumatic deicer inflation pattern in accordance with the present is illustrated. The graph is representative of the pressure in the air supply conduit 210 of FIG. 3. The peak pressure for such a system is on the order of 18–22 psi. It can be seen that the deicer 212 is inflated and deflated in a pulsating or vibrating pattern. That is, as the air pressure in deicer 212 gradually increases, small, higher frequency pulses or vibrations 230 are added superimposed onto the low frequency inflation pressure wave. The higher frequency pulsation causes the outer skin of deicer 212 to vibrate or pulsate after it is inflated. It has been found that a deicer which vibrates or pulsates in such a manner sheds ice much more effectively than pneumatic deicers in the prior art. The inflation pressure (M) for deicer system 200 is on the order of 18–22 psi, with an inflation time (I) on the order of 3–6 seconds. It is preferred that the frequency ratio of the high frequency pressure pulses to the low frequency inflation pressure wave be on the order of 10 to 1. The amplitude ratio of the peak to peak (M) low frequency inflation pressure wave to the peak to peak (N) high frequency pulse is on the order of 2 to 1. It is to be noted that the high frequency pulse 230 sequence doesn't have to be sustained over the entire length of the low frequency pressure wave. For instance, the high frequency pulse sequence may be utilized only when the pulse wave pressure is above a specific limit (L). Other patterns or sequences may likewise be utilized.

Figure 6A:
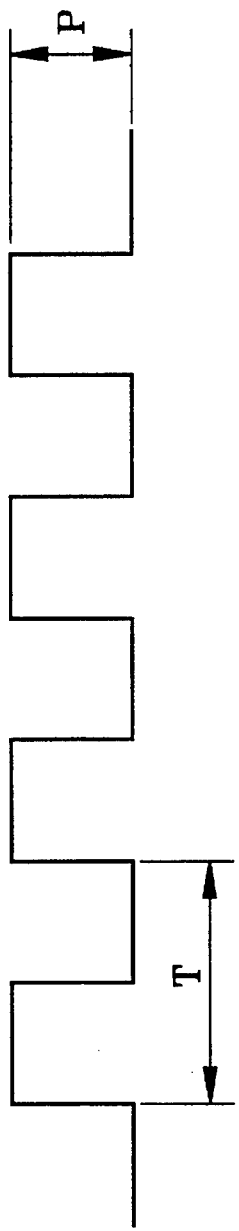
FIGS. 6a–6d are graphical representations of various vibration patterns for utilization in the inflation pattern for a pneumatic deicing system in accordance with the present invention.

Referring now to FIGS. 6a–6d, wherein four sets of different pulsation pattern embodiments are illustrated. FIG. 6a illustrates a square wave pattern. It is to be noted that a square wave pattern having a peak to peak pressure differential (P) on the order of half of the low frequency inflation pressure wave, or 10 psi, and a time period (T) on the order of 0.2 seconds is preferred.

Figure 6B:
Figure 6C:
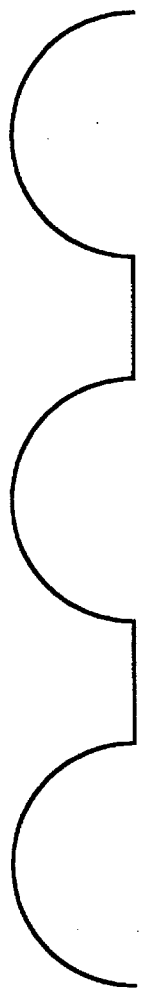
Figure 6D:
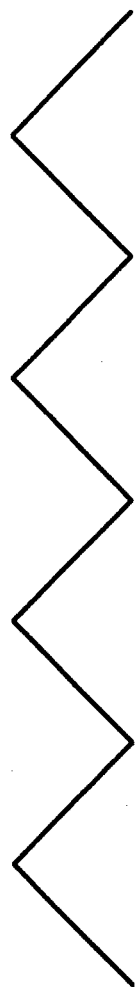

FIG. 6b illustrates a full wave rectified sine function. FIG. 6c illustrates a half wave rectified sine function. FIG. 6d illustrates a triangular wave. It is to be noted that any of a number of other inflation and/or pulsation patterns not specifically illustrated herein may also be utilized.

Although the invention has been shown and described with exemplary embodiments thereof, it should be understood by those skilled in the art that the foregoing and various other changes, omissions and additions may be made therein and thereto without departing with the spirit and the scope of the invention.

I claim:

1. An apparatus for removing ice from an airfoil comprising:

an inflatable deicer comprised of a top layer having a modulus of elasticity less than 40,000 kPa and at least one inflatable member for distorting said top layer; and, an inflation apparatus for inflating said inflatable member in an inflation pattern comprised of a sequence of high frequency pressure pulses superimposed on a low frequency inflation pressure wave.

2. An apparatus for removing ice from an airfoil in accordance with claim 1, wherein the frequency ratio of said high frequency pressure pulses to said low frequency inflation pressure wave is on the order of 10 to 1.

3. An apparatus for removing ice from an airfoil in accordance with claim 1, wherein the frequency ratio of said high frequency pressure pulses to said low frequency inflation pressure wave is at least 10 to 1.

4. An apparatus for removing ice from an airfoil in accordance with claim 1, wherein the amplitude ratio of the peak to peak amplitude of said low frequency inflation pressure wave to said high frequency pressure pulses is on the order of 2 to 1.

5. An apparatus for removing ice from an airfoil in accordance with claim 1, wherein the amplitude ratio of the peak to peak amplitude of said low frequency inflation pressure wave to said high frequency pressure pulses is at least 2 to 1.

6. An apparatus for removing ice from an airfoil in accordance with claim 1, wherein the inflation time of said low frequency inflation pressure wave is greater than one second.

7. An apparatus for removing ice from an airfoil in accordance with claim 1, wherein said top layer is comprised of chloroprene.

8. An apparatus for removing ice from an airfoil in accordance with claim 1, wherein said top layer is comprised of polyurethane.

9. An apparatus for removing ice from an airfoil in accordance with claim 1, wherein said sequence of high frequency pressure pulses is a square wave.

10. An apparatus for removing ice from an airfoil in accordance with claim 1, wherein said sequence of high frequency pressure pulses is a triangular wave.

11. An apparatus for removing ice from an airfoil in accordance with claim 1, wherein said sequence of high frequency pressure pulses is a sine wave.

12. An apparatus for removing ice from an airfoil in accordance with claim 1, wherein said inflatable deicer is further comprised of:

a bottom layer of elastomer disposed on the airfoil;

a nonstretchable layer of plastic fabric disposed on said first layer;

a stretchable layer of plastic fabric disposed on said nonstretchable layer; and, wherein said top layer is disposed on said stretchable layer, and wherein said inflatable member is formed by sewing said nonstretchable layer and said stretchable layer together in a predetermined pattern.

13. A method of deicing an airfoil comprising the steps of:

disposing an inflatable deicer to the airfoil, said inflatable deicer having a top layer having a modulus of elasticity less than 40,000 kPa and at least one inflatable member for distorting said top layer; and, inflating said inflatable member in an inflation pattern comprised of a sequence of high frequency pressure pulses superimposed on a low frequency inflation pressure wave.

14. A method of deicing an airfoil in accordance with claim 13, wherein the frequency ratio of said high frequency pressure pulses to said low frequency inflation pressure wave is on the order of 10 to 1.

15. A method of deicing an airfoil in accordance with claim 13, wherein the frequency ratio of said high frequency pressure pulses to said low frequency inflation pressure wave is at least 10 to 1.

16. A method of deicing an airfoil in accordance with claim 13, wherein the amplitude ratio of the peak to peak amplitude of said low frequency inflation pressure wave to said high frequency pressure pulses is on the order of 2 to 1.

17. A method of deicing an airfoil in accordance with claim 13, wherein the amplitude ratio of the peak to peak amplitude of said low frequency inflation pressure wave to said high frequency pressure pulses is at least 2 to 1.

18. A method of deicing an airfoil in accordance with claim 13, wherein the inflation time of said low frequency inflation pressure wave is greater than 1 second.

19. A method of deicing an airfoil in accordance with claim 13, wherein said top layer is comprised of chloroprene.

20. A method of deicing an airfoil in accordance with claim 13, wherein said top layer is comprised of polyurethane.

21. A method of deicing an airfoil in accordance with claim 13, wherein said sequence of high frequency pressure pulses is a square wave.

22. A method of deicing an airfoil in accordance with claim 13, wherein said sequence of high frequency pressure pulses is a triangular wave.

23. A method of deicing an airfoil in accordance with claim 13, wherein said sequence of high frequency pressure pulses is a sine wave.

24. A method of deicing an airfoil in accordance with claim 13, wherein said inflatable deicer is further comprised of:

a bottom layer of elastomer disposed on the airfoil;

a nonstretchable layer of plastic fabric disposed on said first layer;

a stretchable layer of plastic fabric disposed on said nonstretchable layer; and, wherein said top layer is disposed on said stretchable layer, and wherein said inflatable member is formed by sewing said nonstretchable layer and said stretchable layer together in a predetermined pattern.

* * * * *